United States Patent [19]
Coucoulas et al.

[11] 4,195,982
[45] Apr. 1, 1980

[54] METHOD FOR EXTRUDING ARTICLES

[75] Inventors: Alexander Coucoulas, Bridgewater Township, Somerset County; John R. Nis, Hamilton Township, Mercer County, both of N.J.

[73] Assignee: Western Electric Company, Incorporated, New York, N.Y.

[21] Appl. No.: 973,481

[22] Filed: Dec. 26, 1978

[51] Int. Cl.² .................. C03B 37/02; C03B 50/16
[52] U.S. Cl. ........................ 65/134; 55/55; 65/2; 65/135; 264/526
[58] Field of Search .............. 65/2, 134, 135; 55/55, 55/189; 75/49

[56] References Cited
U.S. PATENT DOCUMENTS

| 1,598,308 | 8/1926 | Pike | 65/135 |
| 2,485,851 | 10/1949 | Stevens | 65/134 X |
| 3,019,275 | 1/1962 | Lorenz | 65/134 X |
| 3,331,673 | 7/1967 | Baur | 65/134 X |
| 3,519,412 | 7/1970 | Olink | 65/135 X |

OTHER PUBLICATIONS

Bibliography on "Gases in Glass" Glass Industry, 1938, p. 458, Washburn et al., Abstract. 65-134.

Primary Examiner—Robert L. Lindsay, Jr.
Attorney, Agent, or Firm—D. J. Kirk

[57] ABSTRACT

A gas head extrusion apparatus (10), having upper (12) and lower (13) chambers, is arranged to feed glass particulate (60) into the upper chamber (12). The particulate (60) is heated to consolidate the particulate (60) into a first viscous melt (71) as an elevated gas pressure is simultaneously applied within the chamber (12). The first viscous melt (71) is urged through a narrow opening (16) in the bottom (14) of the upper chamber (12) into the lower chamber (13) to form a second viscous melt (73). The lower chamber (13) is pressurized to a second pressure, $P_2$, where $P_1 > P_2$. Gas bubbles, having an internal pressure, $P_1$, formed during the consolidation process in the upper chamber (12), will expand in the lower chamber (13) to facilitate removal thereof from the melt (73). The lower pressure, $P_2$, also causes the melt (73) in the lower chamber (13) to be extruded through an annular opening (29), in the bottom of the lower chamber (13), to form a substantially bubble-free hollow glass tube (74).

8 Claims, 3 Drawing Figures

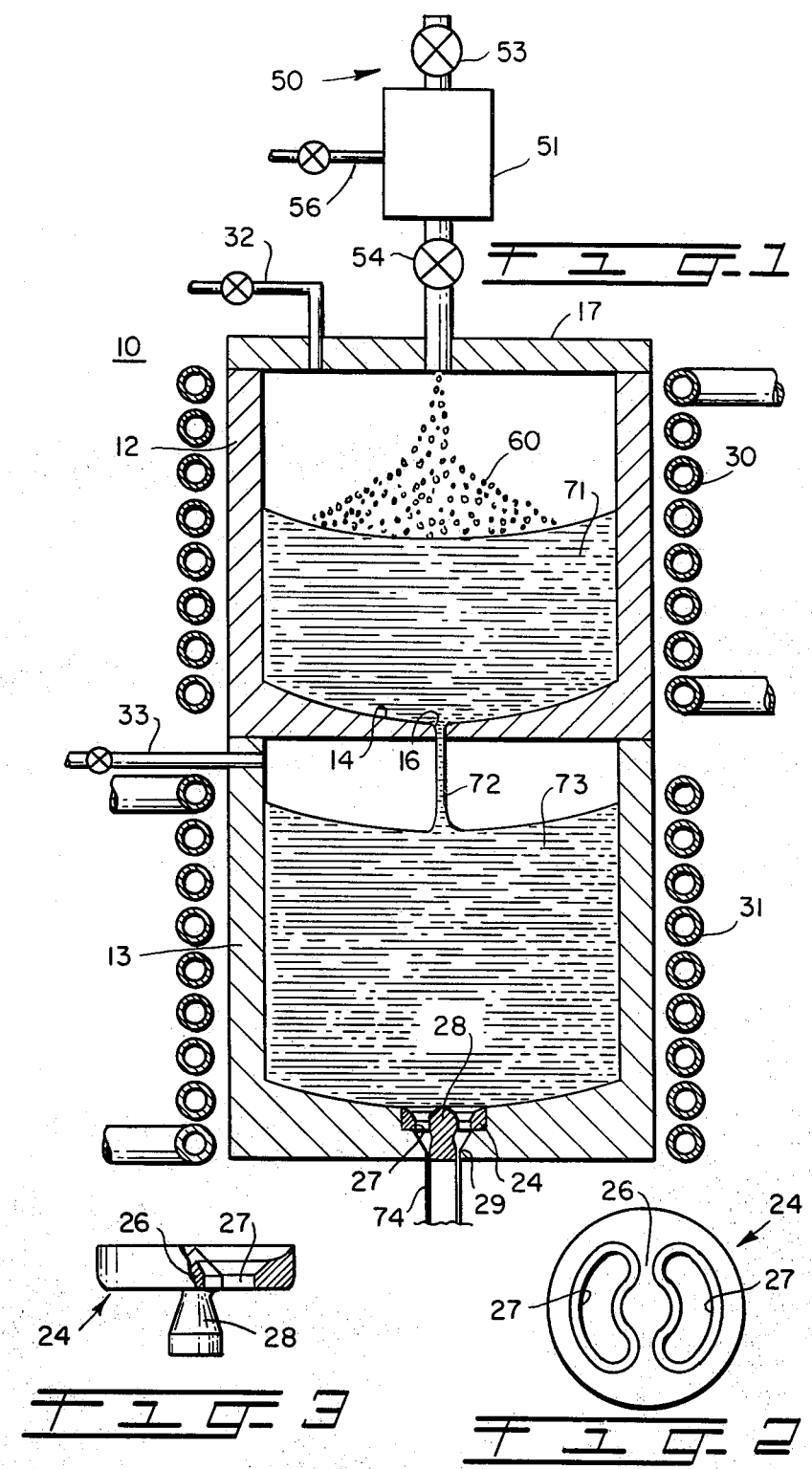

METHOD FOR EXTRUDING ARTICLES

TECHNICAL FIELD

The instant invention relates to a method for extruding articles. In particular, the method is directed to a gas head extrusion technique to form articles from a substantially bubble-free viscous melt.

BACKGROUND OF THE INVENTION

Many techniques have been used to draw or extrude molten glass into various shapes (e.g., rods, fibers, hollow tubes). U.S. Pat. No. 3,331,673 to Bour describes a two-chamber system used to draw glass fibers. A viscous glass melt in an upper chamber is fed into a lower chamber through an orifice in the bottom surface of the upper chamber. The viscous melt is homogenized by causing it to fall in a stream from the upper chamber into a pool of melt in the lower chamber while maintaining the viscosity, rate of flow and the length of the liquid stream so as to cause the stream of viscous melt to be deposited on the surface of the pool in a spiral pattern.

U.S. Pat. No. 2,306,164 to Harrison, assigned to Bell Telephone Laboratories, Inc. describes a device for extruding a tube of hollow glass from a melt using a gas pressure head. Glass particles are placed in a cylindrical container having an annular opening in one end thereof. Heat is applied to the cylindrical container to form a melt of the glass particulate and then an inert gas, under high pressure, is injected into the container to cause the viscous glass melt to flow through the opening to form the tube.

In both of these methods small bubbles or pockets of gas remain in the drawn fiber or the extruded tube, and for most uses such small bubbles present no problem. However, when the fiber or the hollow tube of glass is to be used in the fabrication of optical waveguide, the bubbles can seriously affect the transmission characteristics of the waveguide.

SUMMARY OF THE INVENTION

The instant invention overcomes the foregoing problems with a method of forming a substantially bubble-free viscous melt from a solid particulate material, the method comprising the steps of: simultaneously subjecting the solid particulate material to an elevated temperature and gas pressure to consolidate the particulate into a viscous melt while inducing the elevated pressure in any bubbles formed therein; and lowering the gas pressure to expand the gas bubbles to increase the upward mobility thereof wherein the bubbles will rise to the top of the melt and break through the surface of the melt.

BRIEF DESCRIPTION OF THE DRAWING

FIG. 1 is a cross-sectional view of a gas head extrusion apparatus embodying the instant concepts;

FIG. 2 is a top view of the die used to extrude the molten glass into a hollow cylindrical tube; and FIG. 3 is a partial cross-sectional view, in elevation, of the extrusion die of FIG. 2.

DETAILED DESCRIPTION

Although the exemplary embodiment is directed to extrusion of glass, it is only for purposes of exposition and not for limitation. The instant technique can be implemented with other materials such as plastics or the like.

FIG. 1 of the drawing is a cross-sectional view of the instant gas head extrusion apparatus, generally designated by the numeral 10. The apparatus 10 comprises sealably attached upper and lower chambers 12 and 13, respectively. The upper chamber 12 has a bottom 14 with a narrow opening 16 therein. A cover plate 17 is sealably fastened to the top of the upper chamber 12. A mandrel 24 (see FIGS. 2 and 3) is force fitted into a circular die opening 25 in the bottom of the lower chamber 12. The mandrel 24 has a web 26 which defines substantially semi-circular openings 27—27 as shown in FIG. 2, and a cylindrical stem 28. When the mandrel 24 is in place, an annular opening 29 is formed between the surface of the stem 28 and the surface defining the circular die opening 25.

First and second coil windings 30 and 31 are connected to different power sources (not shown) and surround the upper and lower chambers 12 and 13, respectively, to inductively, heat said chambers. The chambers 12 and 13 may be fabricated from material such as molybdenum which provides the strength required for a pressure vessel and can be readily inductively coupled. First and second valved pressure lines 32 and 33 communicate with the upper and lower chambers 12 and 13, respectively, and each are connected to a different pressurized gas source (not shown). Additionally, a continuous particulate supply means, generally indicated by the numeral 50, is fixedly mounted on the cover plate 17. The supply means 50 comprises a hopper 51 having first and second valves 53 and 54 located at the input and output lines thereof and a third valved pressure line 56 communicating therewith.

During "start-up" of the extrusion apparatus 10, valves 53 and 54 are open and the valved lines 32, 33 and 56 are closed. Particulate 60 is fed through the hopper 51, into the upper chamber 12, to partially fill the chamber to about one-half its volume. The particulate 60 may be fused silica, quartz crystal, borosilicate glass or the like of a size which is much greater than the narrow opening 16 which is circular in geometry. Once the particulate 60 has been deposited in the upper chamber 12, the valves 53 and 54 are then closed, the coil windings 30 and 31 are energized and the valved line 32 simultaneously opened to apply a gas pressure (e.g., argon, helium, a forming gas or the like) within the upper chamber 12. The heat induced in the upper chamber 12 by the coil 30 causes the particulate 60 to soften and consolidate into a molten mass. When fused silica glass particulate 60 is used, the temperature of the upper chamber is brought to approximately 2,200° C. to form a viscous melt in the range of about $10^4$ poise.

As the particulate 60 initially flows, it effectively seals the narrow opening 16 and the chamber 12 is rapidly pressurized to approximately 400 psi. The consolidation of the glass particulate 60 continues to take place in the upper chamber 12, at the elevated temperature and pressure, resulting in a first viscous melt 71 being formed. Undesirably, during the consolidation process, a multitude of gas bubbles are formed in the melt 71. Glass tubes extruded from such a melt 71 have proven to be unacceptable for use in glass preforms from which optical fibers are drawn. However, it has been found that by subjecting the glass particulate 60 to an elevated gas pressure during the consolidation process, substantially all of the bubbles may be removed, as will be hereinafter described.

As the gas pressure head in the upper chamber 12 increases to a predetermined value, the first viscous melt 71 will be extruded through the opening 16 as a narrow stream 72 which falls into the lower chamber 13 to accumulate as a second viscous melt 73 in the lower chamber 13. The second inductive coil winding 31 will have been activated to maintain the temperature in the lower chamber 13 at about 2,000° C. for fused silica glass. As the volume of the melt 73 increases, the valved line 33 is open to pressurize the chamber 13 to extrude the melt 73 through the annular opening 29 as a hollow cylindrical tube 74.

The gas pressure head, $P_1$, in the upper chamber 12 will always be greater than the gas pressure head, $P_2$, in the lower chamber 13 and $P_2$ will be greater than the pressure outside the apparatus 10 (i.e., normally atmospheric pressure). By so maintaining the pressure ($P_1 > P_2$), the bubbles formed during the consolidation process in the upper chamber 12 will have an internal pressure of $P_1$; and, as the bubbles pass into the narrow molten stream 72, which is subjected to a lower pressure, $P_2$, many of the bubbles will expand and break through the surface of the stream. Some bubbles will pass into the second melt 73, but due to their expanded size, will rise towards the top surface of the second melt with a greater velocity or mobility than bubbles not subjected to elevated pressure during consolidation following Stokes' modified equation:

$$V = \frac{D^2 g (d_s - d_m)}{12\eta}$$

where
V = velocity of bubble (cm/sec)
D = bubble diameter (cm)
g = acceleration of gravity (cm/sec$^2$)
$d_s$ = density of the bubble (grams/cm$^3$)
$d_m$ = density of molten glass (grams/cm$^3$)
$\eta$ = viscosity of the glass (poises)

Accordingly, the second melt 73 will have a significant reduction of bubbles therein resulting in a substantially bubble-free tube 74 extruded therefrom.

Alternatively, the apparatus 10 can be arranged to seal the opening 16 with a shutter arrangement (not shown) and consolidate the particulate 60 under elevated temperature and gas pressure as hereinbefore described. When the particulate 60 has been fully consolidated to form the viscous melt 71, and with the opening 16 still sealed, the pressure in the upper chamber 12 is lowered substantially (e.g., from 400 psi. to 14.7 psi. when using fused silica glass particulate). The pressurized bubbles will expand and quickly rise towards the top surface of the melt 71 for the reasons hereinbefore set forth resulting in a substantially bubble-free or fined viscous melt. The gas pressure is then increased and the opening 16 is unsealed to extrude the fined melt 71 into the lower chamber 13 for extrusion as a substantially bubble-free glass tube 74.

In order to provide a continuous gas head tube extrusion process, as all of the particulate glass 60 is discharged from hopper 51, the valve 54 is closed, the valve 53 opened and the hopper again filled. The valve 53 is then closed and the hopper 51 pressurized to the same pressure as chamber 12. The valve 54 is then opened to add the particulate 60 to the upper chamber 12 to maintain the melt 71 at a predetermined level and to continue consolidation thereof at the elevated temperature and pressure.

Additionally, it should be clear to one skilled in the art to provide a plurality of openings 16 in the bottom 14 of the upper chamber 12. The opening 16 may take on a variety of geometries (e.g., circular, square, rectangular, polygonal, etc.) as long as the opening is smaller than the particulate 60 and large enough to permit the viscous melt 71 to be extruded therethrough.

The number of annular openings 29 in the lower chamber 13 may also be increased to simultaneously extrude a plurality of hollow tubes 74. Various other articles (e.g., cylindrical rods, fiber, etc.) may be fabricated using the instant techniques by substituting the mandrel 24 with an appropriate geometry in the die opening 25.

What is claimed is:
1. A method of forming a substantially bubble-free viscous melt from a solid particulate material, the method comprising the steps of:
   simultaneously subjecting the solid particulate material to an elevated temperature and gas pressure to consolidate the particulate into a viscous melt while inducing the elevated pressure in any bubbles formed therein; and
   lowering the gas pressure to expand the gas bubbles to increase the upward mobility thereof wherein the bubbles will rise to the top of the melt and break through the surface.
2. The method of claim 1, wherein:
   the particulate material is quartz crystal.
3. The method of claim 1, wherein:
   the particulate material is fused silica glass.
4. A method of extruding a substantially bubble-free article by applying a gas pressure head to a melt of viscous material to urge the viscous melt through a die, the method comprising the steps of:
   simultaneously subjecting glass particulate in a first chamber to an elevated temperature and gas pressure to consolidate the particulate into a first viscous melt while inducing the elevated pressure in any bubbles formed therein;
   urging the first viscous melt through a narrow opening in the first chamber into a second chamber to form a second viscous melt, the second chamber having a lower pressure therein than the first chamber to expand the bubbles in the second melt to increase the upward mobility of the bubbles which break through the surface of the melt; and
   extruding the substantially bubble-free melt through a die in the second chamber to form the article.
5. The method of claim 4 which is further characterized in that:
   the first viscous melt urged through the opening forms a narrow stream from which the bubbles readily escape upon expansion when subjected to the lower pressure within the second chamber.
6. The method of claim 4, wherein:
   the particulate material is quartz crystal.
7. The methods of claim 4, wherein:
   the particulate material is fused silica glass.
8. The method of claim 4 wherein:
   the die has an annular opening therein; and
   the article is a hollow, cylindrical tube.

* * * * *